US010656931B2

(12) United States Patent
Brzozowski (10) Patent No.: US 10,656,931 B2
(45) Date of Patent: May 19, 2020

(54) NETWORK EVENT TRIGGERED SOFTWARE UPDATES

(75) Inventor: John Jason Brzozowski, Schwenksville, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 12/471,760

(22) Filed: May 26, 2009

(65) Prior Publication Data

US 2010/0306319 A1 Dec. 2, 2010

(51) Int. Cl.
*G06F 8/65* (2018.01)

(52) U.S. Cl.
CPC ........................... *G06F 8/65* (2013.01)

(58) Field of Classification Search
CPC .......................................................... G06F 8/65
USPC ........................ 709/220, 222; 717/168, 173
See application file for complete search history.

(56) References Cited

U.S. PATENT DOCUMENTS

| 5,870,610 | A  | * | 2/1999  | Beyda .............................. | 717/173 |
|-----------|----|---|---------|------------------------------------|---------|
| 6,151,708 | A  |   | 11/2000 | Pedrizetti et al.                  |         |
| 6,266,809 | B1 | * | 7/2001  | Craig et al. .................... | 717/173 |
| 6,971,095 | B2 | * | 11/2005 | Hirai et al. ..................... | 717/173 |
| 7,124,176 | B2 | * | 10/2006 | Doraisamy ...................... | 709/222 |
| 7,346,672 | B2 | * | 3/2008  | Harvey, IV ..................... | 709/221 |
| 8,266,260 | B2 | * | 9/2012  | Pathak et al. .................. | 709/221 |
| 8,387,112 | B1 | * | 2/2013  | Ranjan et al. .................. | 726/2   |

| 2001/0047407 | A1 | * | 11/2001 | Moore et al. .................. | 709/223 |
|--------------|----|---|---------|-------------------------------|---------|
| 2004/0044751 | A1 | * | 3/2004  | Doraisamy ..................... | 709/220 |
| 2005/0034115 | A1 | * | 2/2005  | Carter et al. .................. | 717/173 |
| 2005/0066019 | A1 |   | 3/2005  | Egan et al.                    |         |
| 2006/0070129 | A1 | * | 3/2006  | Sobel et al. ..................... | 726/23  |
| 2006/0218528 | A1 |   | 9/2006  | Lerner et al.                  |         |
| 2006/0271926 | A1 |   | 11/2006 | Hutton et al.                  |         |
| 2007/0157192 | A1 |   | 7/2007  | Hoefler et al.                 |         |
| 2007/0250605 | A1 | * | 10/2007 | Duchene et al. ............. | 709/220 |
| 2009/0007091 | A1 | * | 1/2009  | Appiah et al. ................ | 717/171 |
| 2010/0070961 | A1 | * | 3/2010  | Auer et al. .................... | 717/168 |

FOREIGN PATENT DOCUMENTS

| EP | 1083482   | 3/2001  |
|----|-----------|---------|
| EP | 1211587   | 6/2002  |
| WO | 03/085513 | 10/2003 |

(Continued)

OTHER PUBLICATIONS

Treece et al., DOCSIS Firmware Management Challenges, BT Diamond IP Whitepaper, Copyright 2007, BT INS, Inc., pp. 1-7.

(Continued)

*Primary Examiner* — Philip J Chea
*Assistant Examiner* — Robert B McAdams
(74) *Attorney, Agent, or Firm* — Banner & Witcoff, Ltd.

(57) ABSTRACT

Systems and methods may provide for identifying a network event trigger generated in response to a network event being identified due to receipt of a message, from a client device, comprising a request for or to extend a configuration parameter. The systems and methods may further provide for identifying a software update for software of the client device in response to the network event trigger, and communicating a software update message comprising the software update to cause updating of the software of the client device.

20 Claims, 4 Drawing Sheets

(56) References Cited

FOREIGN PATENT DOCUMENTS

WO    2005045562    5/2005

OTHER PUBLICATIONS

European Patent Application No. 10162210.8, Extended European Search Report dated Sep. 30, 2010.
European Office Action—EP 10162210.8—dated Sep. 2, 2015.
Canadian Office Action—CA Appl. 2,703,262—dated Jan. 8, 2016.
Canadian Office Action—CA Appl 2,703,262—dated Dec. 28, 2016.

* cited by examiner

NETWORK EVENT TRIGGERED SOFTWARE UPDATES

BACKGROUND

Multiple system operators (MSOs) may rely on client devices to provide services to their customers, and the client devices may rely on software to provide these services. Examples of MSOs include cable, satellite, and broadcast television providers. In order to maintain proper operation of the client devices, the software may need to be periodically updated or changed to another version or release level.

Conventionally, a MSO server would poll each client device operating in a particular MSO to identify whether the software of each client device was up-to-date. If outdated, the MSO server would provide the client with a software update.

For MSOs having a large number of client devices, an extensive amount of network resources and processing time may be consumed to support polling of each client device. With larger systems, the time taken to poll each client device and complete a software update may even outlast the version of software being updated, i.e., the updated software may already be out of date by the time all of the client devices have been updated.

BRIEF SUMMARY

The following presents a simplified summary of some example aspects of the present disclosure in order to provide a basic understanding. This summary is not an extensive overview, and is not intended to identify key or critical elements or to delineate the scope of the claims. The following summary merely presents some concepts in a simplified form as a prelude to the Detailed Description provided below.

Some aspects of the present disclosure are directed to an apparatus, method, software, and system for identifying a network event to trigger a determination of whether to update software of a client device.

More specifically, methods, apparatuses, software, and systems in accordance with some example aspects of the present disclosure provide for identifying a network event trigger generated in response to a network event being identified due to receipt of a message, from a client device, comprising a request for or to extend a configuration parameter, identifying a software update for software of the client device in response to the network event trigger, and communicating a software update message comprising the software update to cause updating of the software of the client device.

Further, methods, apparatuses, software, and systems in accordance with some example aspects of the present disclosure provide for receiving a message from a client device via a data network, identifying the message as a network event based on the message comprising a request for or to extend a configuration parameter, and triggering a determination of whether to update software of the client device in response to identification of the network event.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

In the following description of various embodiments, reference is made to the accompanying drawings. It is to be understood that other embodiments may be utilized and structural and functional modifications may be made without departing from the scope of the present disclosure.

Figure 1:
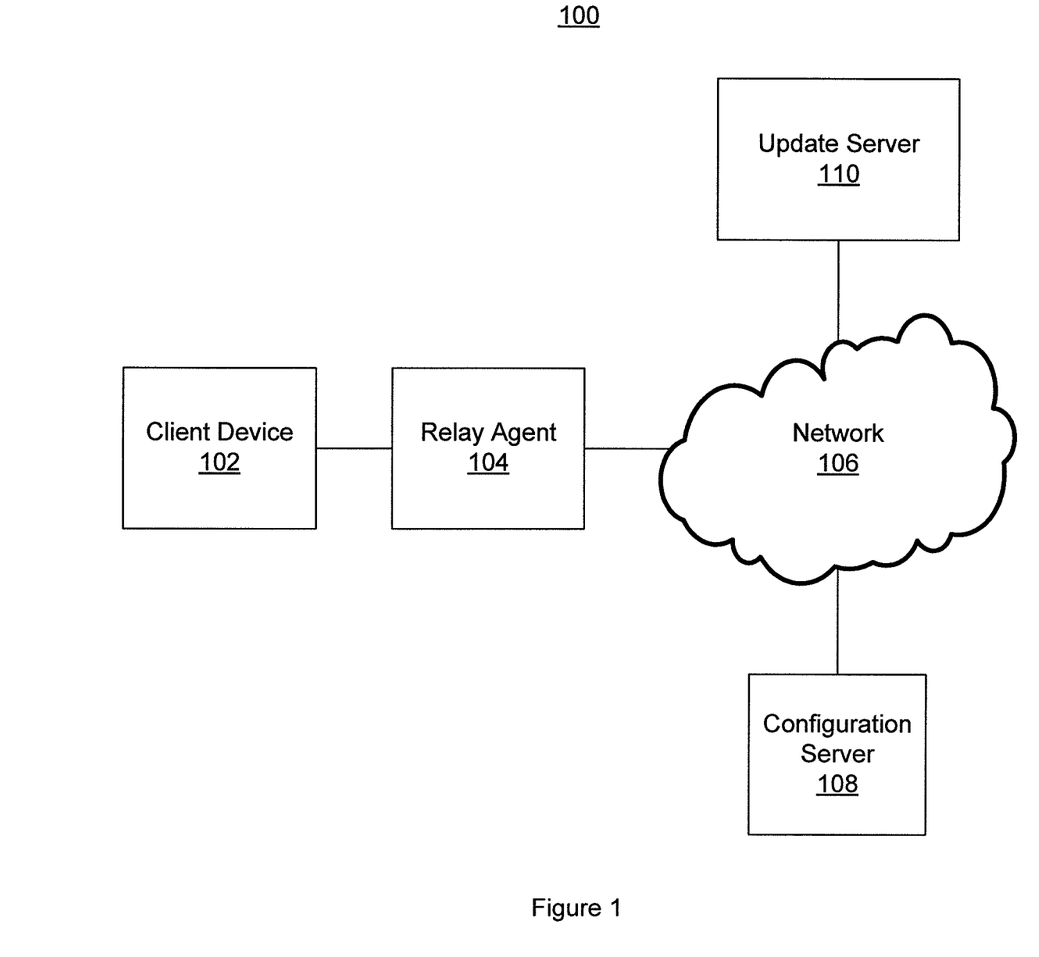
FIG. 1 is a functional block diagram of a system in accordance with example embodiments of the present disclosure.

FIG. 1 illustrates a system in accordance with example embodiments of the present disclosure. The system 100 may include a client device 102, a relay agent 104, a network 106, a configuration server 108, and an update server 110. The network 106 may be a cable network, the Internet, a telco broadband network, a wireless network, an enterprise network, any combination thereof, and/or any collection of devices useable to communicate data. Only a single instance of each component (e.g., client device, relay agent, etc.) is depicted in FIG. 1; however, the system 100 may include multiple instances of each component, the components may be integrated with another, and/or the functions of each component may be divided and embodied in multiple sub-components.

The system 100 may identify network events to trigger a determination of whether to update software of the client device 102. Examples of client devices 102 may include modems (e.g., cable modems), computers, multimedia terminal adapters (MTAs), set-top boxes (STBs), Data Over Cable Service Interface Specification (DOCSIS) compliant devices, phones (e.g. internet protocol, wired, wireless, cellular, etc.), voice devices, video devices, Digital Subscriber Line (DSL) modems, routers, switches, wireless devices, any combination thereof, and/or any device containing software that may communicate via a network.

Network events may be identified at certain times during the life cycle of the client device 102 where it is convenient to update software with little disruption in the use of the client device 102. For example, the first time the client device 102 comes online and attempts to obtain a configuration parameter for communicating via network 106, such as, but not limited to, a network address, the system 100 may make a determination of whether to update software of the client device 102 before permitting a subscriber to begin using various types of services to reduce or even avoid any user inconvenience or service disruptions potentially caused by updating client device 102 software at a different time, such as while the user is interacting with the client device 102.

Reducing or avoiding service disruptions is of particular interest for client devices 102 where software (e.g., application or firmware) updates to be downloaded are large. Firmware may refer to software that provides an operating environment (e.g., an operating system) for a client device 102, and an application may refer to software that runs on top of the operating environment. For example, firmware may be an operating system for an embedded device, such as a cable modem. Multiple versions of firmware may exist for a given make or model of a client device 102 to provide specific functionality or behavior including embedded applications that run with the firmware or operating system/environment. The example embodiments described herein may be used to update client devices 102 in advance of their use, as well as at other times.

A network event may be identified in response to certain messages being communicated by the client device 102 to the network 106. For instance, a network event may be identified in response to the network receiving a request for a configuration parameter from the client device 102. Examples of requested configuration parameters may include a network address for the client device 102 (e.g., an Internet Protocol address), configuration file information, or other information used to permit the client device 102 to communicate via the network 106. In an example embodiment, the client device 102 may attempt to obtain a configuration parameter when it first comes online and at each renewal or expiration period of a previous value of that configuration parameter. The network events may be, for example, dynamic host configuration protocol (DHCP) events using DHCPv4 or DHCPv6 identified by the network 106 in response to the client device 102 attempting to obtain or renew its Internet Protocol (IP) address.

In response to a network event being identified, a comparison may be made of a version and/or release level of software installed on the client device 102 with software scheduled to be operating on the client device 102. In response to the comparison not resulting in a match, the software of the client device 102 may be updated, as described in further detail below.

Figure 2:
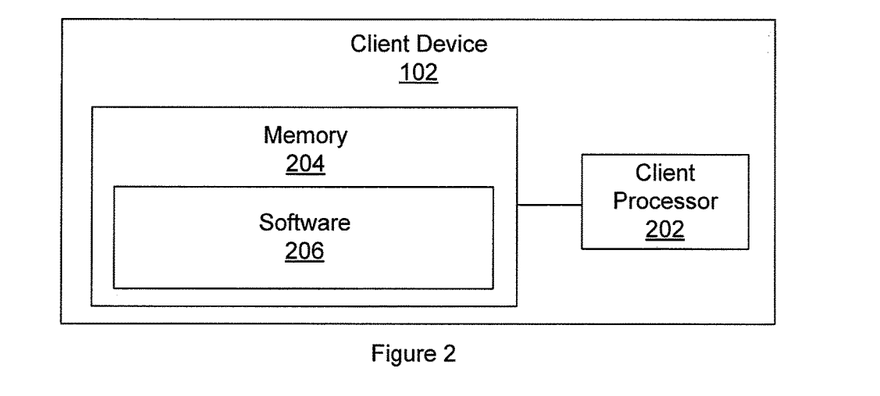
FIG. 2 is a functional block diagram of a client device in accordance with example embodiments of the present disclosure.

FIG. 2 illustrates a client device in accordance with example embodiments of the present disclosure. The client device 102 may include a client processor 202 and a memory 204 and/or other one or more computer-readable storage media configured to store software 206. The software 206 may include one or more software programs having computer code or other computer-executable instructions that, when executed by the client processor 202, cause the client device 102 to provide certain operations, services, and/or functions. The memory 204 may also store attribute information identifying its version and/or release level for each software program. The attribute information may further indicate a vendor, make, model, hardware type, and/or capabilities of the client device 102.

The client device 102 may generate a configuration request message to obtain or renew its configuration parameter to permit the client device 102 to communicate via the network 106. The configuration request message may include the attribute information stored in memory 204. In an example embodiment, the configuration request message may be formatted as a DHCP client request message. The memory 204 may further store other computer-executable instructions separate from the software 206. The client processor 202 may execute the software 206 and/or the additional stored computer-executable instructions to cause the client device 102 to perform any or all of the functions attributed herein to the client device 102.

With reference again to FIG. 1, the client device 102 may communicate the configuration request message to the relay agent 104 for relaying the configuration request message to the configuration server 108 via the network 106. The network 106 may provide for communication of the configuration request message using, for instance, Extensible Markup Language (XML) over Hypertext Transfer Protocol (HTTP), Hypertext Transfer Protocol Secure (HTTPS), Trivial File Transfer Protocol (TFTP), and/or any combination thereof. Other protocols also may be used, such as, but not limited, to protocols suitable for software transport.

The relay agent 104 functionality may reside in an aggregation point or access network technology or element. The relay agent 104 may be embodied as, or otherwise include, for instance, a cable modem termination station (CMTS), an access router, a DHCP relay agent, or any device that may permit one or more client devices 102 to communicate via the network 106. For example, the relay agent 104 that is a CMTS may be coupled to a neighborhood and may aggregate connections to houses in the neighborhood to permit each house to connect to the network 106. In this example, there may be thousands of cable modems that are terminated or connected to a single CMTS. The relay agent 104 may include a processor and a memory and/or other one or more computer-readable media configured to store computer-executable instructions that, when executed, cause the relay agent 104 to perform the functions described herein. The relay agent 104 may receive messages from the client device 102 and may forward the messages to the desired destination. For example, the relay agent 104 may forward messages received from the client device 102 to the configuration server 108. Also, the relay agent 104 may be a source of network event messages that are communicated upstream to the configuration server 108 and/or to the update server 110, as further described below.

Figure 3:
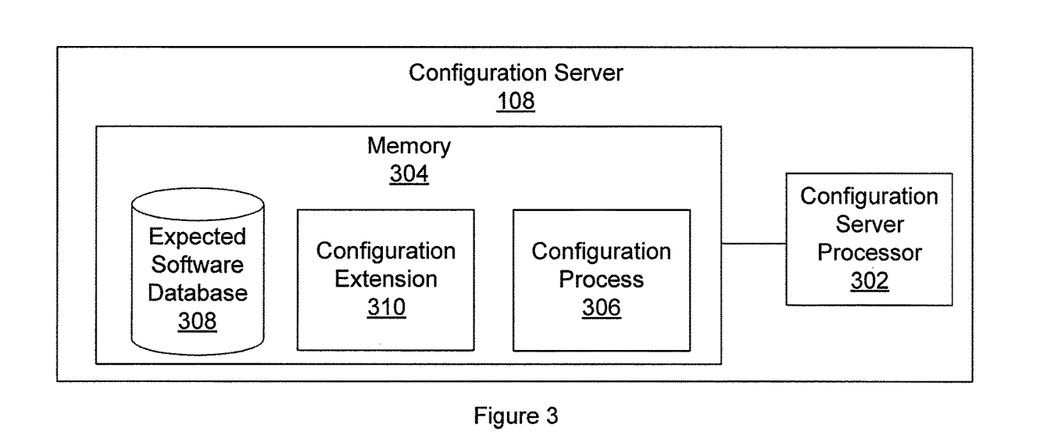
FIG. 3 is a functional block diagram of a configuration server in accordance with example embodiments of the present disclosure.

FIG. 3 is an example functional block diagram of the configuration server 108. The configuration server 108 may include a configuration server processor 302 and a memory 304 and/or other one or more computer-readable storage media configured to store an expected software database 308 and a configuration process 306 as computer-executable instructions, as well as other computer-executable instructions. The memory 304 also may be configured to store a configuration extension 310 as computer-executable instructions. The configuration extension 310 and the expected software database 308 also may be implemented at other devices, such as, but not limited to, at the update server 110, instead of or in addition to being implemented at the configuration server 108. The configuration server processor 302 may execute the computer-executable instructions to cause the configuration server 108 to perform any or all of the functions attributed herein to the configuration server 108.

The configuration server 108 may assign a configuration parameter to permit the client device 102 to communicate via the network 106. In an example embodiment, the configuration server 108 may be a dynamic host configuration protocol (DHCP) server that may be used to automatically assign a configuration parameter to the client device 102. Upon receipt of a configuration request message from a client device 102, the configuration server 108 may assign the client device 102 a configuration parameter including at least a network address (e.g., an IP address) and optionally a lease specifying the length of time the network address is valid.

The configuration server 108 also may identify the configuration request message as being a network event to trigger a determination of whether to update the software 206 of the client device 102. In an example embodiment, any message received by the configuration server 108 from the client device 102, the relay agent 104, or similar devices, may be identified as a network event.

Upon identifying the network event, the configuration extension 310 may process the network event based on its processing capabilities. In an example embodiment, the configuration extension 310 having a lowest level of processing capabilities and may trigger the update server 110 to make a determination of whether to update of the client device 102 by forwarding a network event message including the received configuration request message to the update server 110. Also, the configuration extension 310 may have a middle level of processing capabilities and may determine whether attribute information is included in the configuration request message. If not included or if the attribute information is inadequate, the configuration extension 310 may trigger the update server 110 to query the client device 102 regarding its installed software 206. If included, the configuration extension 310 may determine whether to update the software 206 installed on the client device 102 based on the indicated version and/or release level specified in the attribute information. If software 206 is out of date, the configuration extension 310 may trigger the update server 110 to update the software 206 of the client device 102. In a highest level of processing capabilities, the configuration server 108 may include the functionality of the update server 110 and may perform all aspects described herein of identifying network events and triggering determinations of whether to update software of client devices 102.

To determine whether software 206 of a client device 102 is out of date, the configuration extension 310 may query the expected software database 308 based on the attribute information. The expected software database 308 may contain the software scheduled to be operating on the client device 102 in the system 100. The configuration extension 310 may compare the release level and/or version of the software 206 presently installed on the client device 102 with the release level and/or version scheduled to be operating on the client device 102. If the comparison results in a match, the configuration extension 310 may determine that the software 206 does not require an update. As such, the configuration extension 310 might not communicate further messages or indicators to the update server 110 and/or the client device 102 indicating that the client device 102 has the scheduled software installed, thus potentially reducing network traffic. If the comparison fails to result in a match, the configuration extension 310 may generate a network event message containing the attribute information and a network address of the client device 102, and may cause the configuration server 108 to communicate the network event message to the update server 110 for updating the software 206 of the client device 102.

When the configuration extension 310 and the expected software database 308 are implemented at the update server 110, instead of or in addition to being implemented at the configuration server 108, the configuration server 108 may communicate a network event message including the attribute information to the configuration extension 310 to trigger the update server 110 to determine whether to update the software 206 in the manner described above.

The relay agent 104 may also process messages addressed to the configuration server 108 to identify network events. Once a message addressed to the configuration server 108 is identified, the relay agent 104 may identify the message as a network event and may communicate a network event message to the update server 110 to trigger a determination of whether to update the software 206, thus relieving the configuration server 108 from performing this task. When a network event is identified, the relay agent 104 may modify or supplement the configuration request message received from the client device 102 to indicate that the relay agent 104 has already sent a network event message to the update server 110 so that the configuration server 108 does not duplicate this task.

Figure 4:
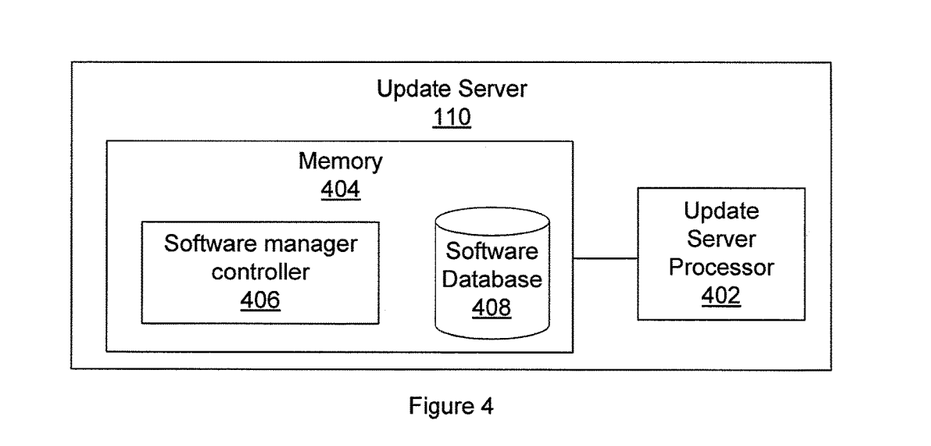
FIG. 4 is a functional block diagram of an update server in accordance with example embodiments of the present disclosure.

FIG. 4 is an example functional block diagram of the update server 110. The update server 110 may include an update server processor 402 and a memory 404 and/or one or more other computer-readable storage media configured to store a software database 408 and a software manager controller 406 as computer-executable instructions. The update server processor 402 may execute the computer-executable instructions to implement the software manager controller 406, and the software database 408 may store the software scheduled to be operating on the client devices 102 in the system 100, as well as any previous or future versions and/or release levels of software. The update server processor 402 may execute the computer-executable instructions to cause the update server 110 to perform any or all of the functions attributed herein to the update server 110.

Upon receipt of the network event message from the configuration server 108 and/or the relay agent 104 triggering the update determination, the configuration extension 308, if implemented at the update server 110 and not at the configuration server 108, may query the expected software database 308 to determine whether an update is available based on the attribute information. If no update is available, then the update server 110 may determine that the client device 102 is already updated. Otherwise, the software manager controller 406 may retrieve the attribute information from the network event message and may query the software database 408 to retrieve a software update for the client device 102. For example, the software manager controller 406 may query the software database 408 based on vendor, make, model, version, release level, capabilities, any combination thereof, and/or other attribute information. The software manager controller 406 may then generate a software update message including the retrieved software update and may cause the update server 110 to communicate a software update message to the network address of the client device 102 included in the network event message. Hypertext Transport Protocol (HTTP), Trivial File Transfer Protocol (TFTP), or other data transfer protocols may be used, for example, to communicate the software update to the client device 102 via the network 106. The client device 102 may install the software update after receipt of the software update message.

The software manager controller 406 also may generate a software update message with a query (e.g., a poll) that instructs the client device 102 to provide additional information if the attribute information in the network event message is insufficient to determine whether to update the software 206 of the client device 102. Once the additional information is received, the software manager controller 406 may communicate a software update message to the client device 102 if the software 206 is out of date.

Thus, the system 100 may identify a network event to trigger a determination of whether to update software 206 of the client device 102 without necessarily having the update server 110 poll each and every client device 102 in the system 100, thereby potentially reducing or even eliminating polling of client devices 102 that already have the most up to date version of software 206 already installed. Further, upon the identification of a network event trigger, the update server 110 also may use polling to obtain additional information from the client device 102 to supplement previously received attribute information to determine whether to update software of the client device 102, thereby determining whether to update client device software at certain times to potentially reduce interference of client device use.

Figure 5:
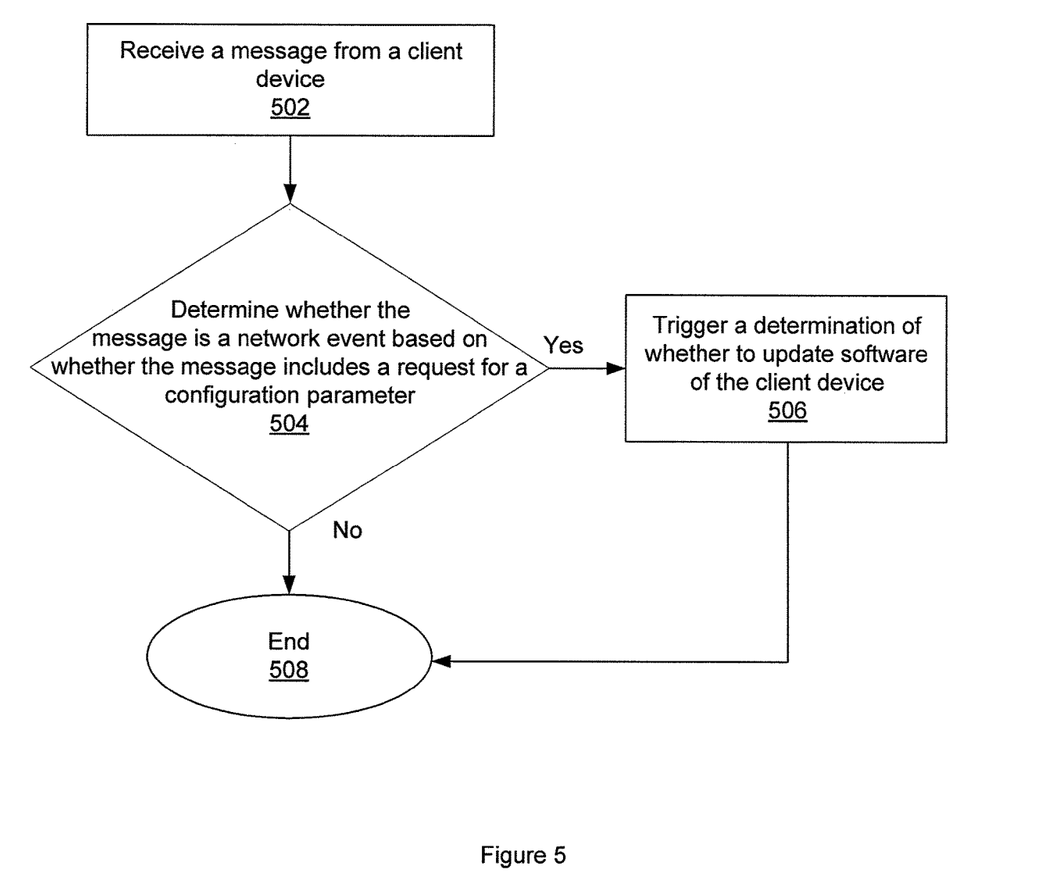
FIG. 5 illustrates a flow diagram of a method for identifying a network event in accordance with example embodiments of the present disclosure.

FIG. 5 illustrates a flow diagram of an example method for identifying a network event that may be performed by the system 100. The method may begin at block 502.

In block 502, the method may include receiving a message from a client device. Referring, for example, to the embodiment of FIG. 1, the relay agent 104 and/or the configuration server 108 may receive a configuration request message from the client device 102.

In block 504, the method may include determining whether the message is a network event based on whether the message includes a request for a configuration parameter. This determining may be performed by, for example, the relay agent 104 or the configuration server 108 processing the message to determine whether it includes a request for a configuration parameter. If not included, the relay agent 104 or the configuration server 108 may forward the message via the network 106 as indicated in the message and the method may continue to block 508 and may end. If the message includes a request for a configuration parameter, the method may continue to block 506.

In block 506, the method may include triggering a determination of whether to update software of the client device. In an example embodiment, the relay agent 104 and/or the configuration server 108 may generate a network event message that includes the attribute information and a network address of the client device 102 from the message and may forward the network event message to the update server 110 to trigger a determination of whether to update software of the client device 102. Also, the relay agent 104 may communicate the network event message to the configuration server 108 that incorporates the functionality of the update server 110 to trigger the determination. Further, a configuration server 108 incorporating the functionality of the update server 110 may trigger itself to make this determination upon identifying a network event. The method may continue to block 508 and end.

Figure 6:
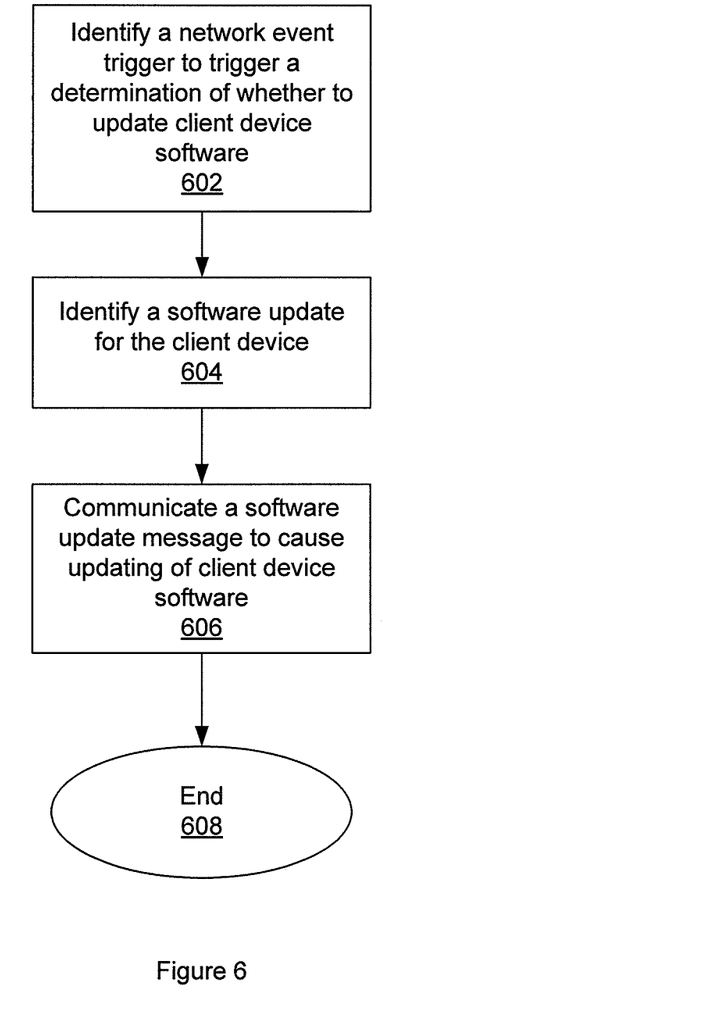
FIG. 6 illustrates a flow diagram of a method for updating software at a client device in accordance with example embodiments of the present disclosure.

FIG. 6 illustrates a flow diagram of an example method for updating software of a client device that may be performed by the system 100. The method may begin at block 602.

In block 602, the method may include identifying a network event trigger generated in response to a network event being identified to trigger a determination of whether to update software of a client device. In an example embodiment, the update server 110 may receive a network event message from the relay agent 104 and/or the configuration server 108 to trigger the determination. The update server 110 may process the attribute information included in the network event message to determine a version and/or release level of the software 206 installed on the client device 102. Also, the functionality of the firmware server 110 may be incorporated into the configuration server 108 and may trigger itself to make this determination based on identifying a network event.

In block 604, the method may include identifying a software update for the client device in response to identification of the network event trigger. In an example embodiment, the software manager controller 406 may query the software database 408 based on the attribute information to identify a software update having the version and/or release level of software scheduled to be operating on the client device 102.

In block 606, the method may include communicating a software update message to cause updating of software of the client device. In an example embodiment, the software manager controller 406 may retrieve the software update from the software database 408, may include the software update in a software update message, and may cause the update server 110 to transmit the software update message via the network 106 to cause updating of software 206 of the client device 102. Also, the software manager controller 406 may determine that the attribute information received in the network event message is inadequate and may query (e.g., a poll) the client device 102 to obtain additional attribute information. Once obtained and if an update is available, the software manager controller 406 may retrieve and forward the software update to the client device 102 in a software update message. The method may then continue to block 608 and end.

Thus, the methods, apparatuses, software, and systems of the present disclosure can be used to keep software installed on one or more client devices up to date, which may overcome the challenges of managing a large number of diverse client devices. For example, receipt of a DHCP client request message from a client device 102 may be identified as a network event to trigger a determination of whether to update the software 206 of the client device 102. The above disclosure thus may be applicable, for instance, to client devices 102 employing DHCP (e.g., DHCPv4 and DHCPv6, respectively for IPv4 and IPv6 modes of operation), in addition to protocols other than DHCP.

Because each of the network events will likely be identified at different times of day for different client devices, it may be expected that a uniform distribution of software updates may be achieved. Moreover, the approaches described herein may allow for timely software updating of client devices while reducing the number of polling messages. The approaches described herein may further allow for efficient use of network resources and may serve to compress the total software updating process into a shorter length of time, as opposed to polling every client device on the network.

The foregoing description was provided with respect to efficient updating of client device software. It is understood that the principles described herein may be extended to different types of client devices and using protocols other than DHCP. The features described in association with a particular example embodiment also may be combined with and/or used instead of features described in association with other example embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method comprising:
  during a time period in which a client device is permitted to use data services via a network, receiving, by a first computing device, a request that is:
    addressed to a second computing device;
    for an extension of use of a network address; and configured to cause the second computing device to
cause a sending, via a third computing device, an
update to software installed on the client device;
based on the request, sending, by the first computing
device and to the third computing device, a message
that is configured to cause sending, via the third computing device and to the client device, of the update; and
sending, by the first computing device and to the second computing device, a modified request for the extension of the use of the network address, wherein the modified request is configured, based on an indication that the first computing device sent the message to the third computing device, to prevent the second computing device from causing another sending, via the third computing device, of the update.

2. The method of claim 1, wherein the request comprises version information identifying a version of the software or a release level of the software, and wherein the method further comprises:
based on the version of the software or the release level of the software not matching information describing software attributes that are scheduled to be operating on the client device, causing the third computing device to send the update to the client device.

3. The method of claim 1, wherein the update to the software comprises an update to an application installed on the client device.

4. The method of claim 1, wherein the request comprises attribute information of the software, and the method further comprises:
based on determining that the attribute information is inadequate, causing the second computing device to query the client device to obtain additional attribute information;
based on determining, from the additional attribute information, that the update is available for the client device; causing retrieval of the update; and
causing the third computing device to send the update to the client device.

5. A system comprising:
a first computing device, a second computing device, and a third computing device;
wherein the first computing device is configured to:
during a time period in which a client computing device is permitted to use data services via a network, receive a request that is:
addressed to the second computing device;
for an extension of use of a network address; and
configured to cause the second computing device to cause a sending, via a third computing device, an update to software installed on the client computing device;
send, to the third computing device and based on the request, a message that is configured to cause sending via the third computing device and to the client computing device, of an update to software installed on the client computing device,
send, to the second computing device, a modified request for the extension of the use of the network address, wherein the modified request is configured, based on an indication that the first computing device sent the message to the third computing device, to prevent the second computing device from causing another sending of the update via the third computing device;

wherein the second computing device is configured to receive the modified request; and
wherein the third computing device is configured to:
receive the message, and
based on the message, send to the client computing device, the update.

6. The system of claim 5, wherein the request comprises a dynamic host configuration protocol request.

7. The method of claim 1, wherein the update to the software comprises an update to firmware installed on the client device.

8. The method of claim 1, wherein the network address comprises an Internet protocol address.

9. The method of claim 1, wherein the request comprises a dynamic host configuration protocol request.

10. The method of claim 1, wherein the message is configured to cause the third computing device to:
determine that the update to the software is available;
retrieve the update; and
send the update to the client device.

11. An apparatus comprising:
one or more processors; and
memory storing instructions that, when executed by the one or more processors, cause the apparatus to:
during a time period in which a client device is permitted to use data services via a network, receive a request, that is:
addressed to a second computing device;
for an extension of use of a network address; and
configured to cause the second computing device to cause, via a third computing device, a sending of an update to software installed on the client device;
based on the request, send, to the third computing device, a message that is configured to cause sending, via the third computing device and to the client device, of the update to software installed on the client device; and
send, to the second computing device, a modified request for the extension of the use of the network address, wherein the modified request is configured, based on an indication that the apparatus sent the message to the third computing device, to prevent the second computing device from causing another sending of the update via the third computing device.

12. The apparatus of claim 11, wherein the request comprises version information identifying a version of the software or a release level of the software, and wherein the instructions, when executed by the one or more processors, further cause the apparatus to:
based on the version of the software or the release level of the software not matching information describing software attributes that are scheduled to be operating on the client device, cause the third computing device to send the update to the client device.

13. The apparatus of claim 11, wherein the update to the software comprises an update to an application installed on the client device.

14. The apparatus of claim 11, wherein the request comprises attribute information of the software, and wherein the instructions, when executed by the one or more processors, further cause the apparatus to:
based on determining that the attribute information is inadequate, cause the second computing device to query the client device to obtain additional attribute information;

based on determining, from the additional attribute information, that the update is available for the client device, cause retrieval of the update; and cause the third computing device to send the update to the client device.

15. The apparatus of claim 11, wherein the update to the software comprises an update to firmware installed on the client device.

16. The apparatus of claim 11, wherein the network address comprises an Internet protocol address.

17. The apparatus of claim 11, wherein the request comprises a dynamic host configuration protocol request.

18. The apparatus of claim 11, wherein the message is configured to cause the third computing device to:

determine that the update to the software is available;
retrieve the update; and
send the update to the client device.

19. The system of claim 5, wherein the request comprises version information identifying a version of the software or a release level of the software, and wherein the first computing device is further configured to:

based on the version of the software or the release level of the software not matching information describing software attributes that are scheduled to be operating on the client computing device, cause the third computing device to send the update to the client computing device.

20. The system of claim 5, wherein the request comprises attribute information of the software, and the first computing device is further configured to:

based on determining that the attribute information is inadequate, cause the second computing device to query the client computing device to obtain additional attribute information;

based on determining, from the additional attribute information, that the update is available for the client computing device, cause retrieval of the update; and cause the third computing device to send the update to the client computing device.

* * * * *

UNITED STATES PATENT AND TRADEMARK OFFICE
CERTIFICATE OF CORRECTION

PATENT NO. : 10,656,931 B2
APPLICATION NO. : 12/471760
DATED : May 19, 2020
INVENTOR(S) : Brzozowski It is certified that error appears in the above-identified patent and that said Letters Patent is hereby corrected as shown below:

In the Specification

Column 6, Detailed Description, Line 27:
Delete "308," and insert --310,-- therefor In the Claims Column 9, Claim 4, Line 38:
Delete "device;" and insert --device,-- therefor Signed and Sealed this
Twentieth Day of December, 2022

Katherine Kelly Vidal
*Director of the United States Patent and Trademark Office*